United States Patent [19]

Lieber et al.

[11] Patent Number: 5,189,300

[45] Date of Patent: Feb. 23, 1993

[54] METHOD AND APPARATUS FOR MEASURING THE ATTENUATION OF AN OPTICAL MEDIUM

[75] Inventors: Winfried Lieber, Krailling; Gervin Ruegenberg, Munich, both of Fed. Rep. of Germany

[73] Assignee: Siemens Aktiengesellschaft, Munich, Fed. Rep. of Germany

[21] Appl. No.: 783,401

[22] Filed: Oct. 28, 1991

[30] Foreign Application Priority Data

Nov. 13, 1990 [DE] Fed. Rep. of Germany ....... 4036074

[51] Int. Cl.$^5$ .............................................. H01J 5/16
[52] U.S. Cl. ................................ 250/227.24; 356/73.1
[58] Field of Search ...................... 250/227.16, 227.24; 356/73.1; 385/15, 24, 40, 48

[56] References Cited

U.S. PATENT DOCUMENTS

| | | |
|---|---|---|
| 4,183,666 | 1/1980 | Tahara et al. ................... 356/73.1 |
| 4,652,123 | 3/1987 | Neumann . |
| 4,664,732 | 5/1987 | Campbell et al. ................. 356/73.1 |
| 5,078,489 | 1/1992 | Lieber . |

*Primary Examiner*—David C. Nelms
*Attorney, Agent, or Firm*—Hill, Steadman & Simpson

[57] ABSTRACT

A method and apparatus for measuring the attenuation of optical medium utilizing a transmitter and a receiver arranged on each side of the medium. In the method, two-measurement series are acquired in succession and the reception signals thereof are derived both from the series using reception signals from both the right and left-hand transmitters on a first receiver, while the second receiver is uncoupled. Then, a second series is performed with the second receiver coupled in and the first receiver uncoupled.

14 Claims, 4 Drawing Sheets

METHOD AND APPARATUS FOR MEASURING THE ATTENUATION OF AN OPTICAL MEDIUM

BACKGROUND OF THE INVENTION

The present invention is directed to a method for measuring the optical attenuation of an optical medium upon employment of two measurement transmitters and two receivers that are arranged at both sides of the optical medium, wherein the transmitters and receivers are each, respectively, coupled to the light waveguide and measurements are implemented proceeding from both sides of the optical medium.

Measuring methods, wherein a flex coupler is employed, are disclosed, for example, in U.S. Pat. No. 4,652,123, whose disclosure is incorporated herein by reference thereto and in allowed U.S. patent application Ser. No. 07/394,114, filed Aug. 15, 1989; which issued as U.S. Pat. No. 5,078,489 on Jan. 7, 1992, whose disclosure is incorporated herein by reference thereto and which claims priority from German Application 38 28 604. As presented in detail in these two documents, particularly exact results can be achieved when work is carried out with two transmitters and two receivers and a plurality of measurements are successively implemented proceeding from both sides of the test subject.

These and all similar measuring methods are based on the measuring principle that the coupling of the receiver or receivers and of the transmitter or transmitters occurs on the basis of at least one so-called flex coupler, wherein the light waveguide experiences a deformation in the measurement region. The light emerging in the deformation region is acquired at the receiver and is offered for evaluation in the measuring equipment. The light is picked up by a rigidly arranged light receiver, for example a photodetector, and is offered for evaluation. The deformed region of the light waveguide at the transmitter is located in the radiation field of a light source, for example a light emitting diode. The quantity of the incoupled or infed light and the outcoupled or outfed light, respectively, is dependent, first, on the spatial allocation of the light waveguide proceedingly bent in the coupling region vis-a-vis the light receiver and also on the refractive index ratio and on the geometry of the optical boundary surfaces in the flex coupler insofar as no matching of refractive index occurs, either by immersion or elastic material. In and of itself, the measuring instrument is already operational immediately after the mechanical actuation of the flex coupler, for example after the closing of a cover, and the measurements could be immediately begun.

It has been shown, however, that more and more inprecise values are obtained the earlier the measurement is carried out after bending of the light waveguide into the coupling position. The investigations have led to the conclusion that a chronological variation of the infeed or, respectively, outfeed efficiency apparently occurs, namely in that a deformation or, respectively, a flowing of the coating of the light waveguide occurs in the coating of the light waveguide when subjected to the pressure element that effects the mechanical bending of the light waveguide, for example when subjected to the arbor, bending beam or the like. This flowing, however slight the modification, will change the position of the deformed region with respect to the light source or with respect to the light receiver and also influences the geometry of the optical boundary surface. Such error influences could, in fact, be eliminated in that one waits until the deformation of the coating has ended because the final condition of the radiation field in the direction onto the photodetector has been reached and a chronological change of the measured signals can no longer be identified, given a constant transmission signal.

SUMMARY OF THE INVENTION

The object of the present invention is to improve a method for measuring optical attenuation in an optical medium upon employment of two measuring transmitters and receivers so that the desired measured results can be obtained optimally precisely and reliably.

This object is inventively achieved in that only, respectively, one receiver is coupled for, respectively, one measuring time, wherein the second receiver is not coupled during this time, and in that the two transmitters are activated during the first measuring time and a first measuring sequence is generated in the respective coupled receiver. Subsequently, the previously coupled receiver is decoupled and the other receiver is coupled and a second measuring series is created, during which the transmission signals of the two measuring transmissions are received and in that these two measurement series are utilized for calculating the attenuation.

Since, respectively, one receiver remains closed for a defined period and transmission signals are fed from both measurement transmitters during this time and measured values are acquired therefrom, the influence due to non-linear events, particularly from the flowing of the coating on the measuring precision, is already reduced to a considerable extent. It becomes possible in this way to begin the measurement immediately after the closing of the coupling means with the deformation of the respective light waveguide, even though the flow event of the coating during this deformation has definitely ended in this condition. Otherwise, one would have to wait until the coating had reached its final flow condition in order to obtain an exact measurement. The invention is, thus, distinguished in that a measurement can be very quickly carried out and relatively precise results can be achieved.

The invention also has the advantage that it also greatly limits or, respectively, largely compensates other non-linear events, for example transient response, temperature responses of the measuring equipment, etc., in terms of influence on the measuring precision. The respective measuring time per measurement series can be kept extremely short, for example under 20 seconds, and, preferably, under 10 seconds. The chronological spacing between two measured values lies below 2 seconds and, preferably, below 1 second.

A preferred development of the invention is characterized in that the two measurement transmitters are, respectively, alternately activated, namely such that the chronologically nested measured signals of the one end and of the other transmitters are obtained within a measurement series. This has the advantage that a quasi-simultaneous measurement, or a measurement very closely approximated to this simultaneousness, can be achieved because of the close chronological proximity of the received, measured signal of the two measurement transmitters. The flow process of the coating has advanced only a slight degree within such a short time span, for instance in the order of magnitude of 1 second or less, wherein a measurement is successively carried out with the respective one and then the respective other measurement transmitter so that the influence of the non-linear flow events remains practically negligible when these two chronologically adjacent measured values deriving from the different measurement transmitters are placed in relationship to one another.

An especially advantageous development of the invention is comprised therein that a new measured value is formed by the interpolation from two successive measured values of a measurement series that, respectively, occurs from one transmitter and that this measured value found by interpolation is allocated to the measured value of the respective other transmitter chronologically acquired between the two former measured values for calculating the attenuation. A synthetic measured value is generated in this way; the amplitude value thereof corresponding nearly exactly to the value that would be acquired from a respective complete simultaneous measurement with both measurement transmitters. The error is defined only by the difference that the curvature offers in comparison to straight-line interpolation. This, however, is largely insignificant given the short time intervals with which the measurement is carried out.

The invention is also directed to an apparatus for the implementation of the method of the invention that is characterized in that the two transmitter and two reception equipments are provided, in that the two reception equipments are provided with coupling devices that can be opened and closed and that each of the two reception equipments include two photodiodes that are respectively positioned to pick up light from different directions.

Other advantages and features of the invention will be readily apparent from the following description of the preferred embodiments, the drawings and claims.

DESCRIPTION OF THE PREFERRED EMBODIMENTS

Figure 1:
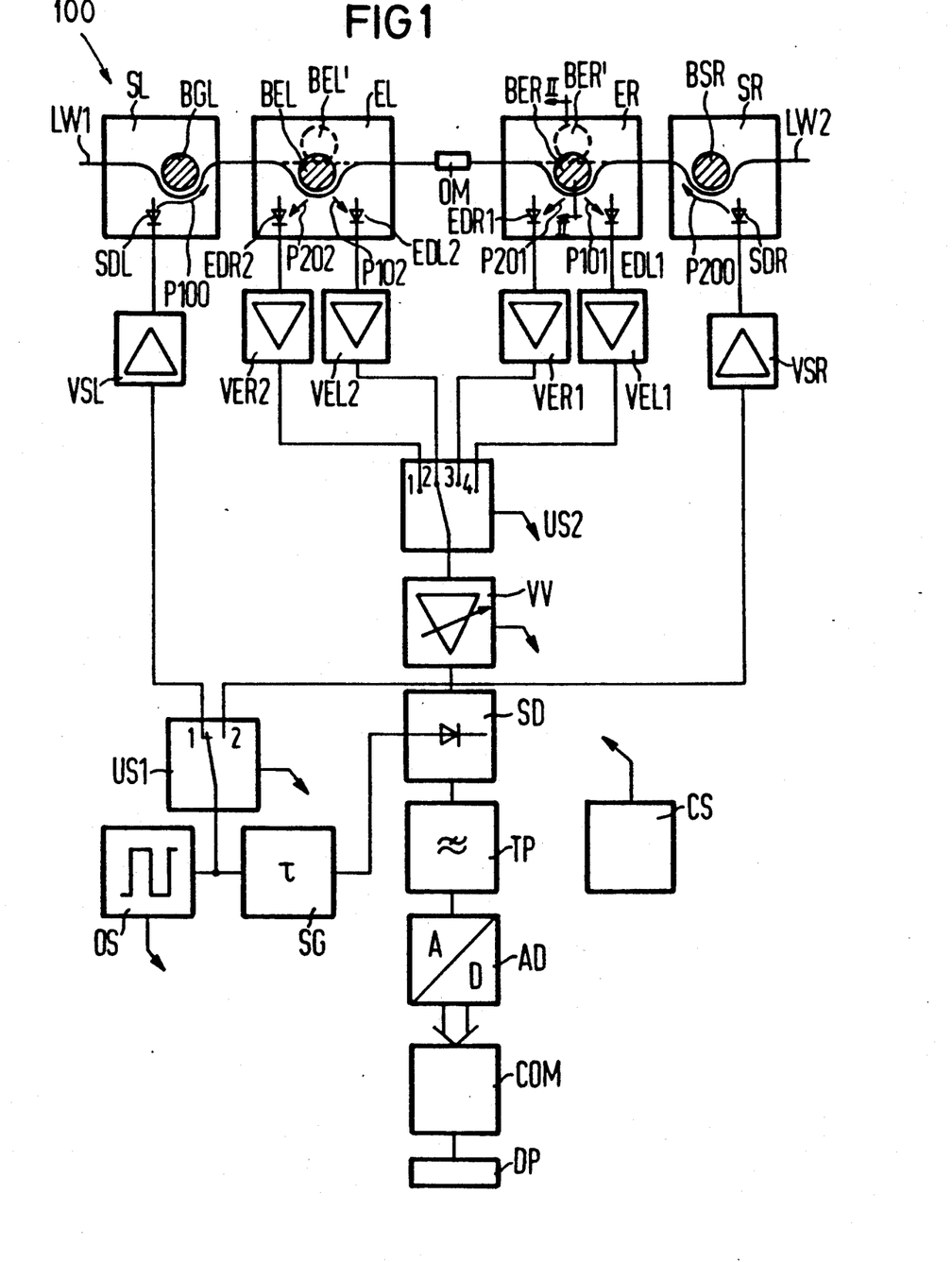
FIG. 1 is a block circuit diagram of an apparatus for the implementation of the method of the present invention.

The principles of the present invention are particularly useful when incorporated in an instrument, generally indicated at 100 in FIG. 1, which is measuring equipment for measuring an optical medium OM, for example a splice location, a light waveguide section having a greater length, an optical cable or the like, which optical medium is connected between two light waveguides LW1 and LW2. An optical transmitter SL, whose transmission diode SDL is provided on the left of the optical medium and an optical transmitter SR having a transmission diode SDR is located on the right side of the optical medium. In addition, an optical receiver EL that has two reception diodes EDR2 and EDL2 is present on the left side, while an optical receiver ER that has photodiodes EDL1 and EDR1 is situated on the right side of the optical medium. The coupling of the two transmitters SL and SR and the two receivers EL and ER is respectively obtained by flex couplers that are schematically indicated by bending arbors that are referenced BGL for the transmitter SL, BEL for the receiver EL, BER for the receiver ER and BSR for the transmitter SR. Details regarding the nature and operation of these couplers are disclosed in greater detail, for example, in allowed U.S. patent application Ser. No. 07/394,111. It is also recited therein that the following measured values can be acquired proceeding from the transmission signal P100 from the optical transmitter SL, which is applied onto the light waveguide LW1. Measured value P102 is obtained by the reception diode EDL2 and measured value P101 is received by the reception diode EDL1. In addition, the following measured values are acquired from the transmission signal P200 from the light which is coupled into the light waveguide LW2 from the optical transmitter SR, which is on the right side of the test subject. These are measured value P202 by the reception diode EDR2 and the measured value P201 by the reception photo diode EDR1.

The attenuation a of the optical medium OM is then proportional to the equation:

$$a \approx \sqrt{\frac{P202 \cdot P101}{P102 \cdot P201}}$$

Figure 2:
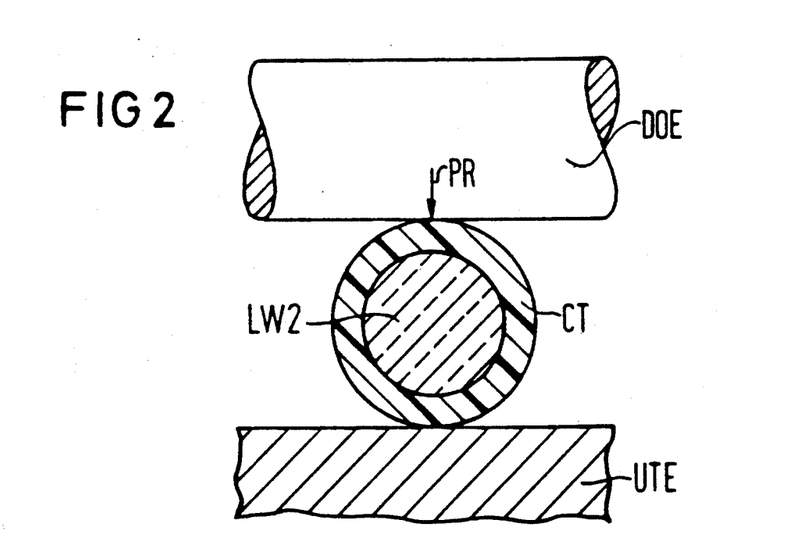
FIG. 2 is a cross sectional view taken along the lines II—II of FIG. 1 showing the deformation of the coating of the light waveguide before the flow caused by the deformation occurs.

In the region of the flex coupler BGL, BEL, BER and BSR of FIG. 1, the respective light waveguide LW1 or LW2 must be pressed against the support with an adequately high pressing power PR in order to assure a defined position in the coupling region. This is shown in FIG. 2, wherein it is assumed that the conditions in the region of the receiver ER are shown. The light waveguide LW2 is shown being pressed by an arbor DOE of the coupler BER against the lower part UTE, wherein the arbor DOE just touches the surface of the coating CT of the light waveguide LW2. The light emerging from the light waveguide LW2 due to bending is picked up by the two reception diodes, such as EDR1 for light coming from the right direction and EDL1 for light coming from the left direction. These two photodiodes EDR1 and EDL1 are stationarily arranged in the coupling region and are dimensioned and aligned so that they pick up an optimum quantity of the light emerging from the waveguide. The optimization of the light-sensitive reception equipment at the receivers ER and EL is, thus, designed for the ultimate condition, i.e., less light is picked up in the transition region wherein the deformation of the coating of the light waveguide has not yet ended than is picked up in the final condition.

Figure 3:
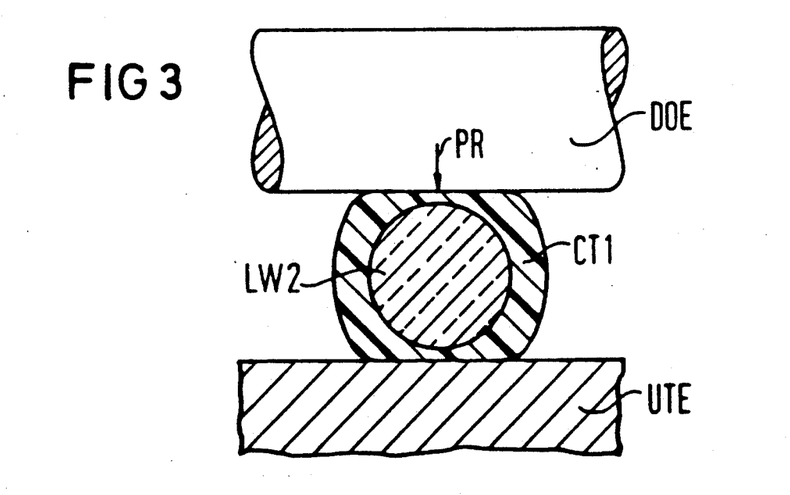
FIG. 3 is a cross sectional view similar to FIG. 2 showing the flow of the coating after the deformation has occurred.

Since an adequately high pressure PR must be exerted, a flowing or, respectively, a deformation of the coating CT will occur under a somewhat long-lasting influence of the arbor DOE. This flowing or, respectively, deformation will assume the distribution illustrated in FIG. 3 in its final condition. A part of the coating material has migrated away from the top and bottom; namely, it has been pressed into the free regions or gap regions between the arbor DOE and the lower part UTE. Overall, a non-uniform distribution of the coating material referenced CT1 will occur. Even though only the coupling at the receiver ER has been illustrated for explanation purposes, the same considerations, of course, are also valid for the coupling of the receiver EL, as well as for the transmitters SL and SR.

Figure 4:
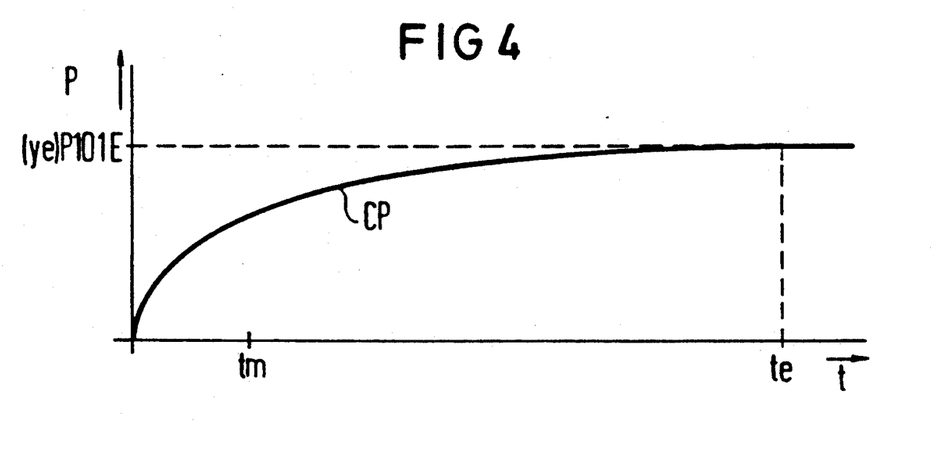
FIG. 4 is a graph showing the time function of the outcoupled power of a receiver dependent on the flow process.

The deformation of the coating will occur according to an e-function curve CP illustrated in FIG. 4. Exact measurements in the final condition could, thus, only be implemented when the coating has reached the final condition of FIG. 3, which is referenced ye. Given current standard coatings, this takes roughly the order of magnitude of 1 minute to 5 minutes. This time is referenced te in FIG. 4.

In order to avoid having to wait this long and that the fiber associated dead time may potentially even have to be observed, measurements are begun in the invention immediately after the closing of the flex coupler, i.e., after the arbor DOE is pressed into the lower part UTE, whereby a chronological course of the reception level is acquired by forming a measurement series of successive measured points within short intervals.

The circuit element indicated in block-circuit diagrams in the lower part of FIG. 1 serves the purpose of editing the transmission signals and evaluating the reception signals. In detail, an oscillator or clock generator OS is shown here that supplies a drive signal for the transmission diode drivers VSL and VSR. A switch-over means US1 is provided for this purpose and this optionally supplies the clock signal to the transmission driver VSL of the left-hand transmitter SL when in the switch position 1, and to the transmission driver VSR of the right-hand transmitter SR when it is in the switch position 2. The switch-over means US1 is driven by a central controller element CS that is expediently synchronized with the clock of the clock generator OS or, respectively, synchronizes this (here, as in the case of other circuit parts US1 and US2, as indicated by the arrow).

The oscillator OS can be eliminated when the operation of the transmission diodes SDL and SDR occurs with constant light. The transmission diode drive stages VSL and VSR drive the transmission diodes SDL and SDR, respectively, whereby the transmission power of the laser diode is regulated by the drive circuit, given employment of laser diodes. For example, 1300 nm light-emitting diodes can be utilized as transmission diodes SDL and SDR. The transmission power is temperature-dependent to a certain degree and is, therefore, also time-dependent due to the dissipated power of the diodes. When the laser diodes that contain an integrated monitor diode are employed for SDL and SDR, this time-dependency at the transmitter side can be compensated with a power regulation on the basis of the corresponding modulation.

At the reception side, each of the reception diodes is connected through a separate pre-amplifier to a contact on a switch-over means US2. For example, the diode EDR2 is connected through a pre-amplifier VER2 to contact points 1 of the switch-over means US2. The diode EDL2 is connected through the pre-amplifier VEL2 to contact point 2, while the diode EDR1 is connected through the pre-amplifier VER1 to contact point 3 and the diode EDL1 is connected through the pre-amplifier VEL1 to contact point 4 of the switch-over means US2. It is also possible to provide only a single, common amplifier instead of the many individual pre-amplifiers VER2–VEL2, whereby the single amplifier would then be arranged following the switch-over means US2.

It is also possible to respectively connect two reception diodes, for example EDR2 and EDL2, of the receiver EL and parallel to a common amplifier and to also provide a common pre-amplifier for the two reception diodes EDR1 and EDL1 and to connect these in parallel to this pre-amplifier. The arrangement of individual amplifiers and their allocations as closely as possible to the respective reception diode, however, has the advantage that especially short transmission paths are required and, thus, the attenuation can be kept low. Moreover, potential differences in the properties of the individual reception diodes EDR2–EDL1 can be compensated by an appropriate setting of the gain of each of the respective pre-amplifiers. The gain factor of the amplifiers VER2–VEL1 are set to fixed values, potentially after a balancing operation.

An amplifier VV having a variable gain is provided following the switch-over means US2. This amplifier serves the purpose of improving the optical range of dynamics of the measuring instrument because the reception level can differ greatly, dependent on the fiber properties. When the dynamics of the circuit are adequate or they can be enhanced in some other way, for example by transmission power that is variable in a defined fashion, a fixed, common amplifier could also be employed instead of the variable amplifier VV.

The variable pre-amplifier VV is followed by a synchronous rectifier SD. This is expedient because a modulation transmission signal is advantageously employed in order to avoid problems with outside light, dark currents and drift. This signal detection by a phase-sensitive rectifier or a synchronous rectifier causes an optimum noise suppression so that an extreme sensitivity is achieved. The synchronous rectifier SD is driven proceeding from the clock generator OS, namely via a delay element or phase shifter SG. The phase shift produced in this way serves for compensating for the signal running time.

The signal detection can also occur on the basis of other methods, for example band-pass filtering having following precision rectification. Given an adequately high reception level, work can also be carried out with an unmodulated light or constant light.

The following low-pass filter TP serves the purpose of suppressing the modulation of the transmission signal. Insofar as the following analog-to-digital converter AD is an integrating converter, a separate low-pass filter TP can be potentially eliminated. The analog-to-digital converter AD converts the analog signal for calculating the measured results of the attenuation into a digital signal.

The respective digitized measured signals are supplied to a computational unit COM that calculates the resultant measured result and offers it in a way suitable for further processing, for example for display on a display means DP or for a printout on a register strip.

a) First Measurement Series

The first measurement series begins with the activation of the left-hand transmitter SL, for example by infeeding the measurement signal P100 into the light waveguide LW1. The switch-over means US1, thus, has the position shown in FIG. 1 and lies on contact 1. The first light waveguide pulse proceeds to the optical test object OM without any attenuation by the receiver EL because the flex coupler is in the broken-line position referenced BEL' and the light waveguide LW1 proceeds in a straight line, as indicated in broken lines. The signal attenuated by OM is partially coupled out in the receiver ER, namely with the signal level that is referenced P101 and then proceeds to the reception diode EDL1. In this measuring condition, the switch-over means US2 must lie the contact 4 so that the measured value that is obtained can be supplied to the circuit parts following the switch-over means US2 for evaluation.

It is possible to generate a first measuring sequence only with connected transmitter SL and to then generate a further sequence only with an activated transmitter SR, as presented later under method number 1. Better results can be achieved when measurement is carried out chronologically nested, as set forth under method number 2 and the following description is based on this measurement case.

The switch US1 is thereby subsequently thrown and the next pulse of the clock generator OS activates the right-hand transmitter SR and the transmission diode SDR couples the measurement signal P200 into the light waveguide LW2. This optical signal is partially coupled out by the coupling means BER and proceeds to the reception diode EDR1 as measurement signal P201. Consequently, the switch-over means US2 must now be moved to the position with the switch contact 3 being engaged. A first measurement series having successive measured values P101 and P201 is acquired in alternation in the described sequence by successive activation of the left-hand transmitter SL and of the right-hand transmitter SR. A chronologically nested first measurement series is, thus, available; the individual values thereof being respectively derived in alternation from the left-hand transmitter SL and the right-hand transmitter SR. The measurement still occurs in the flow region through a time lapse tm, as illustrated in FIG. 4, i.e., the light waveguide LW2 has not yet reached the final position shown in FIG. 3.

After the conclusion of the first measurement series with the coupler receiver ER, the receiver ER is deactivated, and this will be achieved in that the bending beam BER is moved up and is, thus, brought into the position BER' shown in broken lines. As a result thereof, the light waveguide LW2, again, proceeds on a straight line and signals P101 and P201 are no longer coupled out of this light waveguide. Instead, the left-hand receiver EL is activated by moving the bending beam BEL down from the position BEL' to the position illustrated in FIG. 1, wherein the light waveguide LW1 is brought into a bent position so that an outcoupling of the light to the reception diodes EDR2 and EDL2 is possible.

b) Second Measurement Series

At the beginning, the switch-over means US1 is in the position indicated in FIG. 1, i.e., is connected to the contact 1 so that the transmission diode SDL is activated by the next square-wave pulse and the light is coupled into the light waveguide LW1 via the flex coupler BGL. The infed light pulse that propagates on the light waveguide is referenced P100. A part of this light pulse is coupled out from the left-hand receiver EL and is referenced P102. This part is picked up by the reception diode EDL2. The control of the switch-over means US2 must occur so that the switch-over means US2 lies on the contact 2 immediately after the activation of the transmission diode SDL and the infeed of the transmission pulse P100. This contact 2 is connected to the output of the amplifier VEL2. The right-hand transmitter SR is activated with the next square-wave pulse of the clock generator US, to which end the switch US1 must be thrown over into the contact 2, which occurs between the first and second square-wave pulses of the oscillator OS. The transmission diode SDR on the right-hand transmitter SR is, thus, activated by the second pulse of the clock generator OS and feeds a light component P200 into the light waveguide LW2. In order to avoid a dampening of the signal, the flex coupler ER to the right of the optical medium OM is moved up, i.e., an outfeed of the light signal part no longer occurs here. This position is indicated with broken lines and referenced BER'. In this condition, the light waveguide LW2, thus, proceeds through on a straight line. The transmission signal P200 of the transmitter SR will then proceed via the optical medium to the left-hand receiver EL, where the reception diode EDR2 couples a signal part P202 out. Due to the switching of the switch-over means US2 onto the contact 1, which has already occurred, the signal P202 can be supplied via the pre-amplifier VER2 to the further evaluation circuit that begins with the pre-amplifier VV. The left-hand receiver EL remains in the illustrated coupling position over a certain measuring time span and the two transmitters SDL and SDR are successively activated in the way respectively set forth above and a second measurement series is then generated. The odd-numbered measured values thereof being derived from the transmission signal P100 and corresponding to the measured value P101, whereas the even-numbered measured values occur from the transmission signal P200 and correspond to the measured value P202. The switch-over means US2 thereby constantly oscillate back and forth between the contacts 1 and 2.

These measurements are still implemented during the left-hand, curved portion of the curve of FIG. 4, i.e., at the time long before the final value ye is reached, for example value P101E. In and of itself, such measured values that are acquired from such a transition time are not usable for the measurement. Due to the nested acquisition of the measured values from the right and from the left, and due to their being correspondingly placed in relationship to one another, however, a sequence of largely exact measured values that can be evaluated as overall result is, nonetheless, already acquired in the transition region, i.e., within the relatively short measuring time tm.

The invention shall be set forth in greater detail below with reference to a numerical example. The following assumptions are valid only for illustrative purposes: The transmission powers P100 and P200 are constant; the reception level follows the function curve CP shown in FIG. 4. Utilizing the formula:

$$p(t) = \hat{p}(1 - e^{-(t+t0)/\tau})$$

wherein;

p(t)—the time-dependent power;
p̂—the stationary final value for t→∞;
t0—the time that elapses from the closing of the reception coupler up to the beginning of the registration of measured values;
t—the time since the beginning of the registration of measured values, for example after t0; and
τ—the time constant of the creep behavior.

The time t0 is dependent on the user, on the properties of the coupler and on the respective fiber section. t0 and τ can differ from measurement to measurement.

The stationary final values are to be ideally employed for calculating the attenuation a. The equation for calculating the attenuation reads (see allowed U.S. patent application Ser. No. 07/394,114):

$$a = -10 \cdot \log \sqrt{\frac{P202 \cdot P101}{P102 \cdot P201}} \text{ (dB)}$$

If the stationary final values were known, these, for example, could read:

$$\hat{P}202 = 0.45 \quad \hat{P}101 = 0.50$$
$$\hat{P}102 = 1.00 \quad \hat{P}201 = 0.90$$

The exact attenuation would, then, occur as:

$$a = -10 \cdot \log \sqrt{\frac{0.45 \cdot 0.50}{1.00 \cdot 0.90}} = 3.01 \text{ dB}$$

The measured values for P101 and P201 are measured with the same coupler BER of FIG. 1 for the receiver ER in direct succession or nested, followed by the measured value for P102 and P202, which are measured with the receiver EL having the coupler BEL. For example, 1=1 second is assumed for the first measuring event of (P101/P201) and 1=2 seconds is assumed for the second. Let t0 be equal to 3 seconds for both measuring events. The following calculated function values then occur for the powers:

$$P101(t) = 0.5(1 - e^{-(t+3)/1})$$

$$P102(t) = 1.0(1 - e^{-(t+3)/2})$$

$$P201(t) = 0.9(1 - e^{-(t+3)/1})$$

$$P202(t) = 0.45(1 - e^{-(t+3)/2})$$

t is, thereby, the time since the beginning of registration of the measured values.

The various measured values shall be set forth in greater detail below.

1) Successive Measurements and Formation of Average Values

In order to increase the precision (noise suppression by forming average values), respectively, four measured values from every transmissions signal of the transmitters SR and SL (y1-y4 and y5-y8 in FIG. 5 as level values P, dependent on time t) should be registered.

Figure 5:
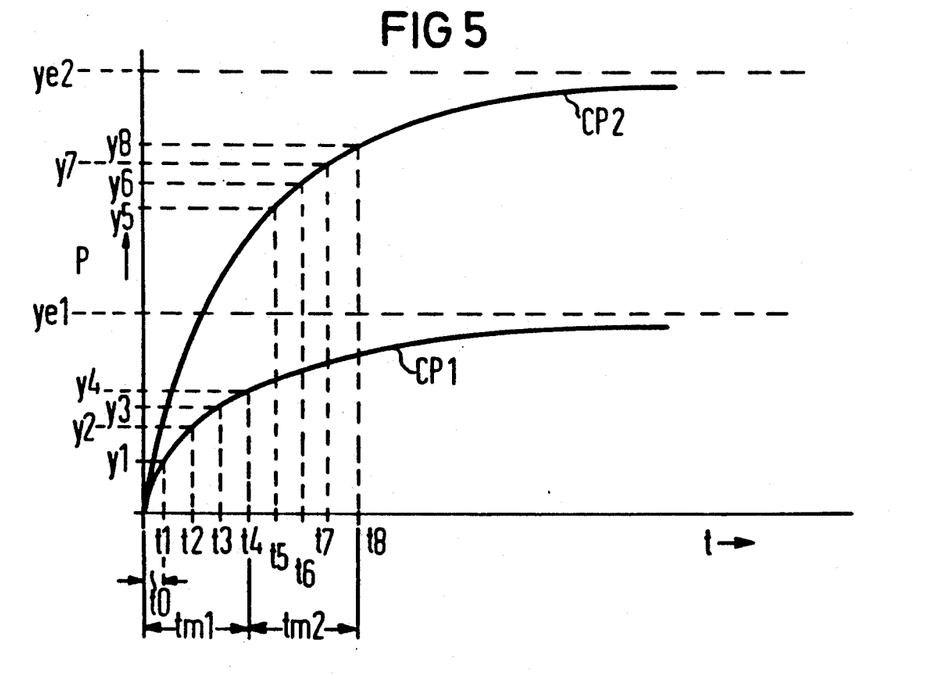
FIG. 5 is a graph of two measurement series based on two non-linear flow curves.

For example, a registration of measured values lasts 1 second. For purposes of simplification, the brief run-up time t0=3 seconds from t=0 through t1 has been shown only with the duration of 1 second in the illustration.

The first measurement, which is illustrated on curve CP1 in FIG. 5, with a final value ye1, is for the signal from the transmitter SL and results in measured values y1-y4 which are measured within the first 4 seconds following t0. The second measurement illustrated in curve CP2 of FIG. 5 has a final value ye2 and is for the transmission signal from the transmitter SR and has measured values y5-y8 subsequently occurs, which are taken in the following 4 seconds. The measurement consequently occurs so that four measurements y1-y4 are implemented in the receiver ER, first, only with the transmission signal P100 from the transmitter SL and the next four measurements y5-y8 are then implemented with the transmission signal P200 from the transmitter SR. The level of the measured values y5-y8 from the transmitter SR are higher than the level of the measured value for the transmitter SL because the values y1-y4 are attenuated by the test subject OM.

The following measured values, which are picked up with the receiver ER of the first measures series, then occur, wherein time t is in seconds elapsed after t0, is respectively recited in parenthesis:

y1     y2     y3     y4
$P101(0) = 0.475 \; P101(1) = 0.491 \; P101(2) = 0.497 \; P101(3) = 0.499$ y5     y6     y7     y8
$P201(4) = 0.899 \; P201(5) = 0.900 \; P201(6) = 0.900 \; P201(7) = 0.900.$ Measured values of the second measurement series occur from the second registration of measured values from the pick-up by the receiver EL:

$P102(0) = 0.777 \; P102(1) = 0.865 \; P102(2) = 0.918 \; P102(3) = 0.950$ $P202(4) = 0.436 \; P202(5) = 0.442 \; P202(6) = 0.445 \; P202(7) = 0.447$

Deriving from the above are average values, which are:

$$\overline{P101} = 0.491; \quad \overline{P201} = 0.900 \quad \overline{P102} = 0.878 \quad \overline{P202} = 0.443.$$

Following therefrom is an attenuation a of:

$$a = -10 \cdot \log \sqrt{\frac{P202 \cdot P101}{P102 \cdot P201}} = 2.80 \text{ dB i.e. error} = 0.21 \text{ dB}$$

Figure 6:
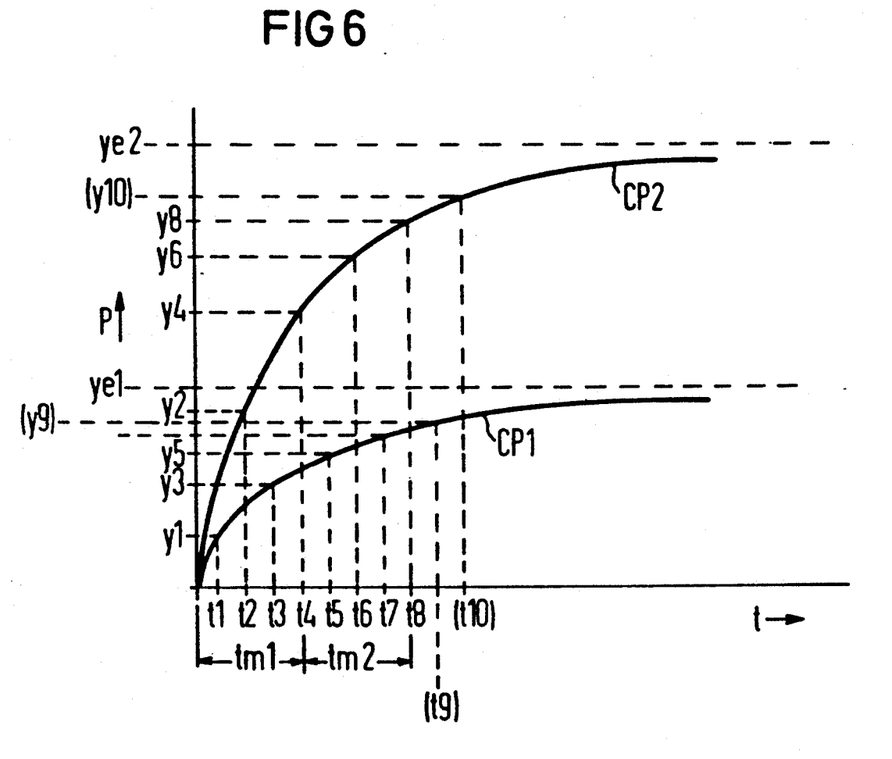
FIG. 6 is an acquisition of chronologically nested measurement series or, respectively, measurement values from two flow curves analogous to FIG. 5.

2) Measurement with Nested Registration of Measured Values and Formation of Average Values All odd-numbered measures y1-y7 according to FIG. 6 are taken from the transmitter signal P100 of the left-hand transmitter SL and all even-numbered values y2-y8 are taken from the transmitter signal P200 of the right-hand measurement transmitter SR. This first measurement series is, again, registered with the receiver ER and the reception P101 coming from the measurement transmitter SL and the reception P201 coming from the measurement transmitter SR are measured in chronological alternation (nested).

$P101(0) = 0.475 \; P101(2) = 0.497 \; P101(4) = 0.500 \; P101(6) = 0.500$ $P201(1) = 0.884 \; P201(3) = 0.898 \; P201(5) = 0.900 \; P201(7) = 0.900.$

For the receiver El, the measured values:

$P102(0) = 0.777 \; P102(2) = 0.918 \; P102(4) = 0.970 \; P102(6) = 0.990$ $P202(1) = 0.389 \; P202(3) = 0.428 \; P202(5) = 0.442 \; P202(7) = 0.447$ are received chronologically nested by the receiver EL as the second measurement series.

The average values read:

$\overline{P101} = 0.493;$ $\overline{P201} = 0.296$ $\overline{P102} = 0.914$ $\overline{P202} = 0.427$ and the attenuation a is calculated therefrom:

$$a = -10 \cdot \log \sqrt{\frac{\overline{P202} \cdot \overline{P101}}{\overline{P102} \cdot \overline{P201}}} = 2.95 \text{ dB, i.e. error} = 0.06 \text{ dB}$$

The measured error is, thus, already significantly smaller in comparison to method 1).

3) Measurement with Nested Registration of Measured Values and Interpolation and Formation of Average Values The measurement occurs nested as forth under Method 2). One respectively additional measured value per registration of measured values, for example per measurement series, is merely required, for example, the measured values y9 and y10, which are illustrated in FIG. 6.

$$\begin{array}{cc} y9 & y10 \\ P101(8) = 0.50 \text{ and } P102(8) = 0.996 \end{array}$$

The other measured values y1-y8 are the same as in Method 2). The intermediate values between P101(0) and P102(3), etc., are now calculated by linear interpolation from respectively successive measured values of one transmitter—in the following example, namely, as:

$$P(t) = \frac{P(t-1) + P(t+1)}{2}.$$

These new, calculated values (thus acquired from SL) of the measurement signals of the transmitter signal SI with the receiver ER of the first measurement series are referenced P101(1), P101(3), P101(5) and P101(7) because these average values chronologically coincide with the values P20(1), P20(3), P20(5) and P20(7) or correspond with them. One obtains:

$P101(1) = 0.486$ $P101(3) = 0.499$ $P101(5) = 0.500$ $P101(7) = 0.500$

AND $P102(1) = 0.821$ $P102(3) = 0.944$ $P102(5) = 0.980$ $P102(7) = 0.993$ and, therefrom, the average values:

$\overline{P101} = 0.496;$ and $\overline{P102} = 0.935.$

The other two average values are as recited under Method 2). Thus, utilizing these average values, attenuation a=2.99 dB, for example the error is 0.02 dB.

From the above, the measurement error is, thus, smallest utilizing the third method.

Although various minor modifications may be suggested by those versed in the art, it should be understood that we wish to embody within the scope of the patent granted hereon all such modifications as reasonably and properly come within the scope of our contribution to the art.

We claim:

1. In a method for measuring the optical attenuation of an optical medium having a light waveguide connected to each side by placing a first measurement transmitter and a first receiver on one side of the optical medium and a second measurement transmitter and second receiver on the other side of the optical medium, wherein each of the transmitter and receivers being optically coupled to a respective one of the light waveguides connected to the optical medium and the measurements being implemented proceeding from both sides of the optical medium, the improvements comprising coupling only the first receiver to the respective waveguide for a first measuring time, wherein the second receiver is not coupled during this first measuring time, alternately activating the two transmitters during said first measuring time to create a first measurement series in the first receiver, then, subsequently uncoupling the first receiver and coupling the second receiver, creating a second measurement series by alternately activating the first and second transmitters, and calculating the attenuation from the two measurement series.

2. In a method according to claim 1, wherein each measurement series is obtained by, first, carrying out a number of measurements for one transmitter only and, then, carrying out a second number of measurements for the second transmitter.

3. In a method according to claim 1, wherein during the measuring of each measurement series, the two measurement transmitters are alternately activated so that a measured signal of one transmitter and then the other transmitter are obtain chronologically nested within the measurement series.

4. In a method according to claim 3, which includes a new measured value being formed by interpolation from two successive measured values of the measurement series that occur from one transmitter in that for calculating the attenuation this measured value found by interpolation is assigned to the measured value of the respective other transmitter which value is chronologically acquired between said two measured values.

5. An apparatus for performing a measuring method of an optical medium which is optically connected to a waveguide on each side, said measuring apparatus including a transmitter and a receiver being connected to each of the two waveguides, each receiver and transmitter having separate actuated optical coupling devices which can be opened and closed independently and that each receiver includes two photodiodes being arranged in the receiver for receiving light travelling in the waveguide from different directions.

6. An apparatus according to claim 5, which includes means for separately activating the two transmitters.

7. An apparatus according to claim 6, which includes means for individually sampling each of the photodiodes of the receivers.

8. An apparatus according to claim 7, which includes a central clock that controls activation of the two transmitters and of the coupling to the receivers.

9. An apparatus according to claim 8, wherein each of the photodiodes has a separate amplifier allocated to it.

10. An apparatus according to claim 5, wherein each of the photodiodes of the receivers has electrical terminals separately conducted out and individually sampled for their signal values.

11. An apparatus according to claim 10, which further includes a central clock for controlling the coupling of the receivers.

12. An apparatus according to claim 11, wherein each of the photodiodes has a separate amplifier allocated to it.

13. An apparatus according to claim 5, wherein each of the photodiodes has a separate amplifier allocated to it.

14. An apparatus according to claim 5, wherein each of the transmitters can be separately activated and the apparatus includes a central clock supplied for controlling the activation of the transmitters.

* * * * *